E. E. FURNEY,
Assignor of two-thirds to R. H. HUNT.
Apparatus for Checking the Waste of Water.
No. 9,759. Reissued June 14, 1881.
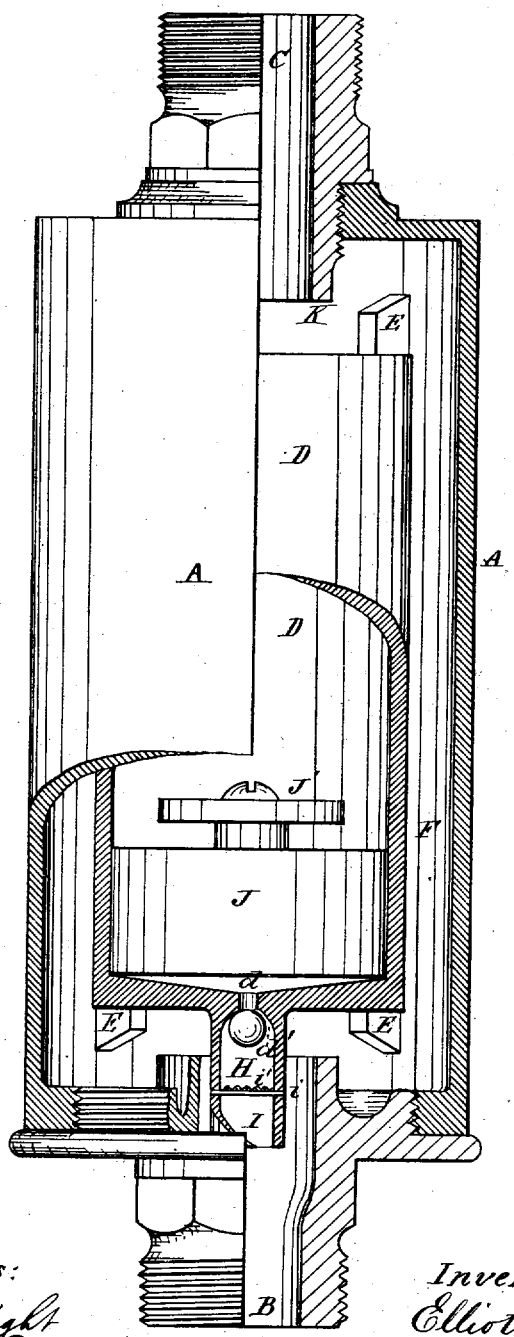
Witnesses:
Geo. H. Knight
L. M. Hopkins
Inventor:
Elliott E. Furney
By Knight Bros.
Attys.
N. PETERS, Photo-Lithographer, Washington, D. C.

UNITED STATES PATENT OFFICE.

ELLIOTT E. FURNEY, OF ST. LOUIS, ASSIGNOR OF TWO-THIRDS TO ROBERT H. HUNT, OF KANSAS CITY, MISSOURI.

APPARATUS FOR CHECKING THE WASTE OF WATER.

SPECIFICATION forming part of Reissued Letters Patent No. 9,759, dated June 14, 1881.

Original No. 232,483, dated September 21, 1880. Application for reissue filed April 9, 1881.

*To all whom it may concern:*

Be it known that I, ELLIOTT E. FURNEY, of the city of St. Louis, in the State of Missouri, have invented a certain new and useful Improvement in Apparatus for Checking the Waste of Water, of which the following is a full, clear, and exact description, reference being had to the accompanying drawing, forming part of this specification.

My improvement consists in a device to be used, in connection with a hydrant or discharge-water pipe and cock or valve, to stop the water-discharge after it has run a certain time, to prevent or check the waste of water.

The particular apparatus shown consists of a cylinder or case through which the water passes, and which contains a cylindrical cup that is preferably movable and forms a gravitating valve to stop or check the flow of water, and which has in the bottom a valve port or orifice, with a ball-valve of less specific gravity than the water, so that its floative character will tend to keep it in contact with the valve-seat. In the valve cup or cylinder is an automatic valve of greater specific gravity than water, and which fits the interior of the cup. When the water is flowing through the apparatus the valve aforesaid is gradually raised by the water entering through the port of the ball-valve, (the ball-valve not quite closing the port.) When the upwardly-moving valve has attained a certain elevation it reaches its seat and nearly closes the eduction-port of the apparatus and substantially stops the flow of water until the hydrant or discharge-cock is closed, and the pressure being thus equalized above and below the stop-valve it subsides, and a subsequent opening of the discharge-cock results in another flow of water. There must be a slight leak in the stop-valve to allow the equalization of the water-pressure above and below on the closing of the discharge-cock.

The drawing is partly in elevation, with portions broken away to show the parts beneath, and one part in axial section, with the parts behind the section-plane shown.

A is a cylinder or section of pipe placed in a vertical position in the course of the water-supply pipe, and coupled therewith by means of the male coupling-members B and C, the lower one, B, being the induction port or opening, and the upper one, C, being the eduction-port of the apparatus.

Within the pipe-section or cylinder A is a cylindrical cup, D, capable of vertical movement in the cylinder, and working against guides E, shown as extending inwardly from the cylinder A, though they may extend radially from the cup D and work against the inside of the cylinder. The office of the wings or guides E is to hold the cup concentrically in the cylindrical case A, to preserve an annular water-space, F, between the cylindrical case A and cup D, and to insure the proper closing of the induction and eduction valves of the apparatus. The cylindrical cup D forms the induction-valve, and when the water is not flowing it settles down by gravity upon the valve-seat G.

In the bottom of the cup-valve D is a valve-port or water-orifice, *d*, nearly closed by a ball-valve, H, which is of less specific gravity than water, so that it remains in the position shown, except when there is a downward flow of water through the port *d*. The ball-valve works in an open-bottomed guide-cylinder, I, and is retained therein by a cross-pin, *i*, above the gauze strainer *i'*, to prevent the entrance of any matters that would interfere with the efficient working of the valve H.

The inside of the cup-valve D should be made nearly or quite true, so as to fit a cylindrical valve-block, J, which rises and falls therein in the manner of a piston, and which constitutes the means for substantially closing the eduction-port C by contact with the valve-seat K. The valve-block J may have cup or other packing to prevent the passage of water, or nearly so, between it and the cylinder D.

I prefer to furnish the top of the valve J with a rubber or other disk or face, J', that will have sufficiently close contact with the seat K to prevent the flow of water in any great quantity; but there is, when the valve is closed, a small leak or passage, allowing the flow of water in small quantity from the chamber below the valve J to the discharge-pipe above the valve to equalize the pressure above and below the valve on the closing of the discharge-cock.

The valve H is made to fit its seat so loosely that a small quantity of water passes through the port *d* when the water is flowing through the discharge-cock, or a small orifice may be made in the bottom of the cup D, or a channel or notch in valve-seat, as shown at *d'*. The water, passing into the cylinder or cup D below the valve J, gradually raises said valve to the seat K, and closes, substantially, the eduction-port C after the water has run a given time, or when a given quantity has been discharged.

It will be seen that it is not absolutely necessary, under all circumstances, to the working of the apparatus that the cylinder-valve D should be movable, for if it should remain stationary in the case the automatic valve would still act with a moderate discharge of water from the discharge-cock. When the discharge-cock is opened very slightly, so as to cause a very small flow of water, it will be seen that the difference in the pressure beneath and above the valve J might not be sufficient to cause the upward movement of the valve where the water has free escape from the induction-port B. In such case the apparatus would not act with full efficiency. Where the valve-cylinder D has the described movable character its position is governed by the amount of water passing. Thus when a small amount of water is passing the valve-cylinder D would be lifted only a small distance from its seat, and the pressure of water beneath the valve J would be maintained.

The operation of the apparatus is as follows: On the opening of the discharge cock or valve of the hydrant or other water-discharge the pressure of the water beneath the valve D raises it and opens the induction-passage B. The water flows upward through the annular space F between cylinders A and D, and then through the eduction-opening C into the discharge-pipe. A small quantity of water enters the cylinder D beneath the valve J and gradually raises it until the face J' of the valve comes in contact with the seat K and substantially stops further flow. The parts remain in this position as long as the discharge-cock remains open. On closing the discharge-cock the pressure is equalized between the upper and under sides of the valve J, in the manner set forth, and as the latter is heavier than water it descends in the valve-cylinder D and forces the water out therefrom through the valve-port *d*.

The ball-valve H may be dispensed with, and the orifice *d* made just large enough to allow the influx of a little more water than would escape between the valve J and cylinder D, so as to cause the required upward movement of the valve J in the cylinder. The valve J might be made to fit the interior of the cylinder easily, and the orifice *d* made of proportionately increased area, as it is of no consequence how much water escapes between the valve J and the cylinder D, if there is a still larger quantity passing through into the cylinder-valve D beneath the valve J.

Although I have described and shown the cylindrical cup-valve D as acting both as a gravitating valve and an inclosing-cylinder for piston-valve J, I wish to be understood that I do not confine myself to such specific construction, for the valve J may slide in a fixed cylinder, and the valve function of the cylinder D be accomplished by an independent valve.

I claim as my invention—

1. In an apparatus for checking the waste of water, a checking-valve or stopping-piston actuated by water admitted through a contracted orifice, and adapted to close, or nearly close, the eduction-port after the passage of a certain amount of water by the difference in pressure on its opposite sides, in combination with a passage from the eduction to the induction pipes, and a valve for partially resisting the flow of water through said passage, substantially as set forth.

2. In an apparatus for checking the waste of water, a checking-valve adapted to close, or nearly close, the eduction-opening, while permitting a small leak or passage of water to connect the water-chambers on opposite sides of the valve when the valve is in its closed position, for the purpose set forth.

3. The combination of chamber A, ports B and C, cup-valve D, and its interior valve, J, said valve D having an orifice in its bottom, with the valve H for closing, or nearly closing, said orifice, operated substantially as and for the purpose set forth.

4. The combination of chamber A, having induction-port B and eduction-port C, with the gravitating valves J and D, the former sliding within the latter, and the latter communicating freely with the port C, and through a narrow orifice, *d*, with the port B, for the purpose set forth.

5. The combination of the chamber A and ports B and C with valves D and J, operating, substantially as described, to close, or nearly close, said ports, for the purpose set forth.

ELLIOTT E. FURNEY.

Witnesses:
SAML. KNIGHT,
GEO. H. KNIGHT.